United States Patent [19]

Boden et al.

[11] Patent Number: 5,338,112

[45] Date of Patent: Aug. 16, 1994

[54] PROCESS AND APPARATUS FOR TWO STAGE TREATMENT OF PLASTIC MATERIALS

[75] Inventors: Hellmut Boden, Illingen; Eberhard Uhland, Bietigheim; Hans Wobbe, Malmsheim, all of Fed. Rep. of Germany

[73] Assignee: Werner & Pfleiderer GmbH, Stuttgart, Fed. Rep. of Germany

[21] Appl. No.: 878,555

[22] Filed: May 5, 1992

[30] Foreign Application Priority Data

Jun. 6, 1991 [DE] Fed. Rep. of Germany ....... 4118530

[51] Int. Cl.⁵ ............................................. B01F 7/24
[52] U.S. Cl. ......................................... 366/75; 159/3;
264/211.23; 264/211.24; 264/349; 264/102;
366/76; 366/91; 425/190; 425/203; 425/204;
425/205; 425/208; 425/209
[58] Field of Search ................... 264/211.23, 349, 101,
264/211.24, 102, 39; 425/204, 205, 208, 209,
190, 203, 812; 366/75, 76, 91; 159/3

[56] References Cited

U.S. PATENT DOCUMENTS

| | | |
|---|---|---|
| 3,226,097 | 12/1965 | Vayda . |
| 3,559,240 | 2/1971 | Kosinsky et al. ............... 425/208 |
| 3,563,514 | 2/1971 | Shattuck ............... 425/205 |
| 3,572,647 | 3/1971 | Staheli . |
| 3,634,574 | 1/1972 | Reinking et al. ........... 264/211.23 |
| 3,717,330 | 2/1973 | Pinney . |
| 3,997,646 | 12/1976 | Schneider et al. ............ 264/349 |
| 4,117,073 | 9/1978 | Koch et al. ............ 425/208 |
| 4,358,550 | 11/1982 | Jacono et al. ............ 264/211.23 |
| 4,943,402 | 7/1990 | Kafka et al. ............ 264/211.23 |
| 5,198,171 | 3/1993 | Kasahara et al. ............ 264/211.23 |

FOREIGN PATENT DOCUMENTS

| | | |
|---|---|---|
| 1557005 | 3/1970 | Fed. Rep. of Germany . |
| 2128468 | 12/1971 | Fed. Rep. of Germany . |
| 47-11906 | 4/1972 | Japan ............ 264/211.23 |
| 1154936 | 6/1969 | United Kingdom . |
| 2116865 | 10/1983 | United Kingdom . |
| 2173441 | 10/1986 | United Kingdom . |

OTHER PUBLICATIONS

European Search Report EP 92 10 5669.
"Kunststoffmaschinenfuhrer" (Guide to Machines for Plastics) pp. 960 to 968, C. H. Verlag, Munich & Vienna, 2nd Edition.

*Primary Examiner*—Mathieu Vargot
*Attorney, Agent, or Firm*—Ladas & Parry

[57] ABSTRACT

In the preparation and production of plastic materials by a continuously operating double shaft screw-type extruder, the efficiency of production often depends on good delivery of material to the extruder. In accordance with the invention for processing various types of plastic materials, a primary stage is mounted in a pressure-tight sealed manner on the housing of the extruder, the primary stage being formed by a vertical double conical container in which a pair of screw-type helices are rotatably supported and driven from above. The helices are connected to two replaceable feed elements at their lower ends so that delivery of material to the extruder is achieved without any intermediate dead spaces.

19 Claims, 2 Drawing Sheets

PROCESS AND APPARATUS FOR TWO STAGE TREATMENT OF PLASTIC MATERIALS

FIELD OF THE INVENTION

The invention relates to processes and apparatus for two stage treatment of plastic material such as in the conditioning or production of plastic material.

The invention particularly relates to processes and apparatus in which a first stage is provided for treatment of plastic material before the plastic material is supplied to a unit such as a screw-type extruder or kneading machine.

BACKGROUND AND PRIOR ART

The construction and operation principles of a continuously operating double-shaft screw-type extruder and its use in the preparation and production of virtually all types of plastic materials is well known in practice and disclosed in literature, see for example, "Kunststoffmaschinenfuhrer" [Guide to Machines for Plastics], pages 960 to 968, Carl Hauser Verlag, Munich and Vienna, 2nd Edition, '84.

In this regard, such screw-type extruders are known which have at least one feed unit and one or more degassing apertures and, optionally, a granulating unit.

In this case, the addition of the starting materials and additives to the extruder can be effected by a gravity system through vertical supply ducts or by means of a vertical or horizontal drive unit.

A batch-type mixer is disclosed in DE-OS 21 29 468 and its US equivalent, U.S. Pat. No. 3,717,330 consisting of a funnel-shaped container in which two screw-type helices are installed, which can be driven from below and mutually scrape against each other and against the inner surface of the wall of the container. The mixer is used for the final processing stage in condensation-type polymerization reactions.

In this way, in essence, a batch-type final processing procedure takes place. However, this self-cleaning mixer is not suitable for the intensive processing of the plastic compositions in order to achieve high quality final products since adequate pressure can only be developed in the lower regions of the container while in the upper regions of the container, dead spaces are produced where intensive mixing does not take place.

In order to increase degassing efficiency, it is also known to install a separate primary stage before the screw-type extruder which consists of a flash evaporator together with a double-shaft screw-type supply unit by which multi-step degassing of polymer solutions, which contain a high proportion of solvent, is effected. High capital expenditure for the equipment is necessary in this case.

SUMMARY OF THE INVENTION

An object of the invention is to provide a process and apparatus by which the economics of the preparation or production of various types of plastic materials can be improved and an increase in efficiency can be achieved in the case of screw-type extruders or kneading machines.

In accordance with the invention, there is provided a process for treating plastic materials in which, in a first stage, a starting material is premixed and heated in a double conical container having a region of maximum cross-section from which the cross-section of the container diminishes in opposite axial directions. The material is advanced in the container towards a second stage constituted by a double shaft screw-type extruder, the advance of the material in the container being effected by rotating a pair of spirals within the container so that the spirals scrape against one another and against the inside wall surface of the container. The material is delivered from the container directly and without dead spaces into the extruder.

In accordance herewith, an economical method for the preparation or production of plastics with various properties is achieved, since methods of preparation, which have already been applied previously to the type of plastic in question, such as preconcentration, homogenization and the removal of large amounts of volatile components, are made possible in the primary stage with adjustable residence times and, as a result thereof, the throughput efficiency in the second stage, e.g. in the subsequent screw-type extruder, is increased. As a result of the self-cleaning and heated primary stage, many types of plastic materials can be prepared optimally which can then be fed to the screw-type extruder in exact amounts. Optimal degassing is provided as a result of the large free volume in the container of the primary stage.

The primary stage can be utilized as a continuously operating reaction chamber for the production of a viscous intermediate reaction product which is fed to the extruder. It can also be utilized as a continuously operating pre-evaporator or as a flash chamber.

In the apparatus of the invention, the container is mounted vertically on a housing of the extruder in sealed relation around an aperture in the wall of the housing and the lower end of the container is open and in communication with the interior of the housing through said aperture. Detachably connected to the lower end of the spirals are feed elements which rotate together with the spirals around axes of rotation thereof. The feed elements extend through said aperture in the housing and have free ends in immediate proximity to mixing means in the housing with little clearance therebetween.

In further accordance with the invention, the feed elements serve to control the residence time of the material in the primary stage and the quantity delivered to the extruder.

An especially advantageous feature of the double conical container for the primary stage is found in the arrangement where the double conical container comprises two truncated conical portions connected in mouth-to-mouth relation at larger diameter ends thereof to provide a region of maximum diameter for the container located closer to the upper end of the container. Preferably, the region of maximum diameter is located about 25% down from the upper end of the double conical container. As a consequence of this arrangement, good mixing is obtained in the primary stage with effective degassing in the upper truncated conical portion of the container. The mixing is further facilitated by supplying the material tangentially of the container in the region of the largest diameter thereof.

Instead of an extruder, the double conical container can be mounted on a gear pump which serves to pump molten plastic material. In this way, a reaction process with longer residence times can be obtained in the primary stage to improve the quality of the product delivered by the gear pump.

The invention also contemplates mounting the double conical container of the primary stage on a single shaft extruder which is advantageous for certain processes steps in the preparation of plastic materials.

In further accordance with the invention, when the primary stage can be mounted at a degassing aperture in the extruder, in which case the double conical container can serve as a degassing dome.

DETAILED DESCRIPTION OF A PREFERRED EMBODIMENT

Figure 1:
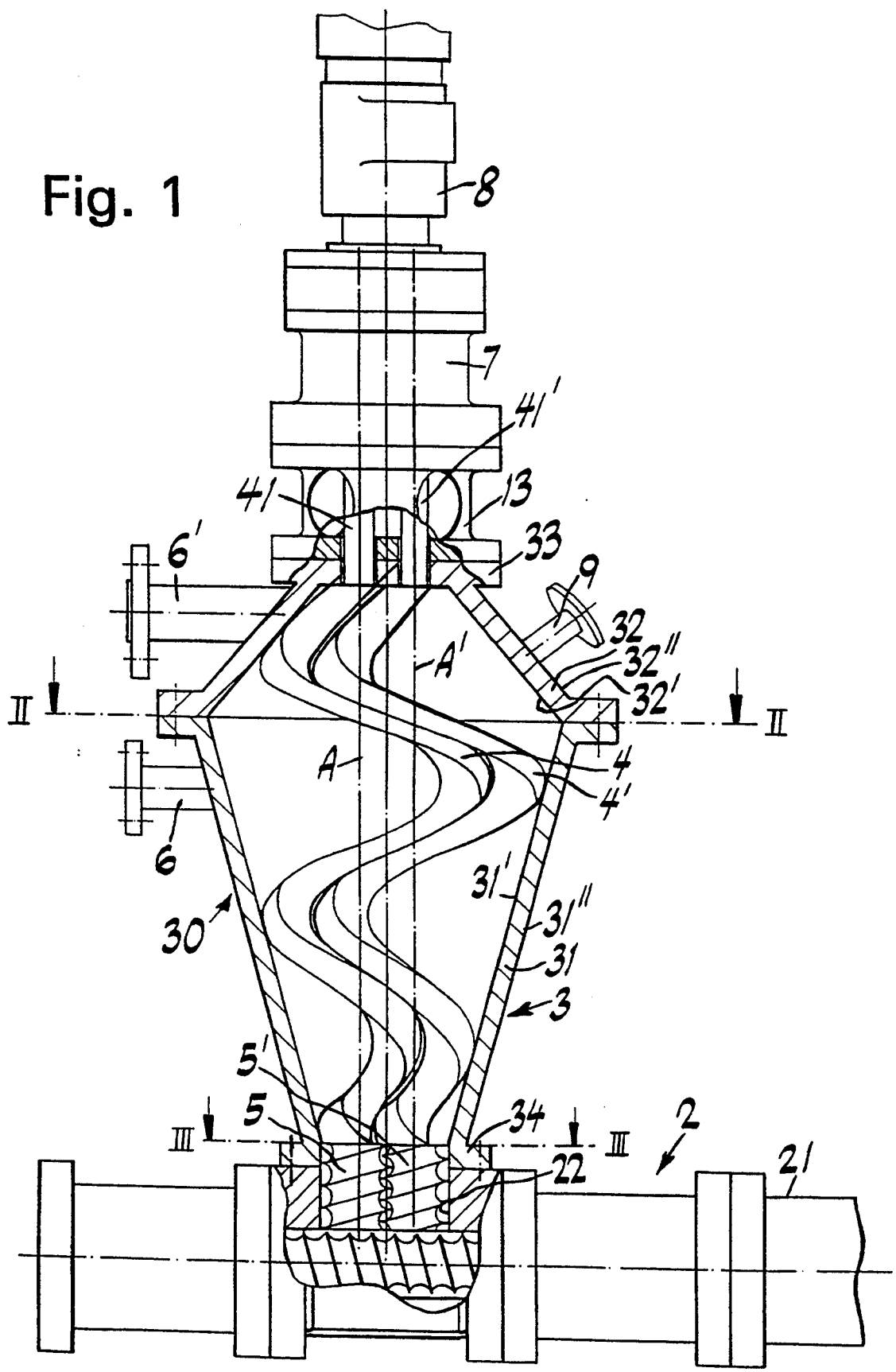
FIG. 1 is an elevation view, partly in section, showing a primary stage unit mounted vertically on a screw-type extruder shown partly broken away and in section.
Figure 2:
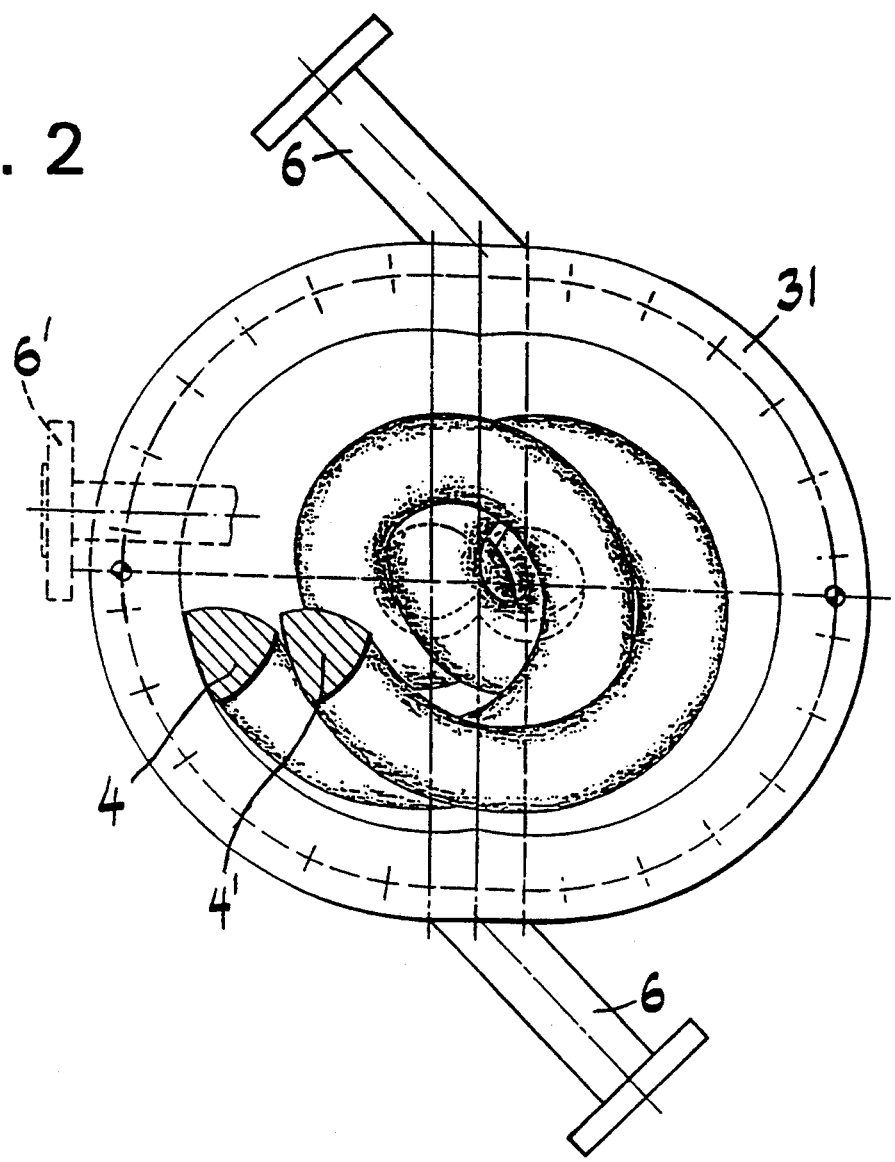
FIG. 2 is a diagrammatic sectional view taken along line II—II in FIG. 1.

Referring to FIG. 1 of the drawing, a screw-type kneading machine 3 is mounted vertically on a double-shaft screw-type extruder 2 to serve as a primary stage for the extruder. The kneading machine comprises a vertical container 30 formed by two truncated conical portions 31 and 32 having respective mating flanges joined together in mouth-to-mouth contact at the largest cross-sections of the conical portions. The lower conical portion 31 of container 30 is attached in pressure-sealed manner, by a flange 34, to the housing 21 of extruder 2 around an aperture 22 provided in the wall of housing 21. The upper conical portion 32 of container 30 is provided with a cylindrical flange 33 which is connected to a spacer component 13. A gear unit 7 and drive motor 8 are mounted vertically above one another on spacer component 13 to serve as a drive means for screw-type helices 4 and 4' which are installed in the double conical container 30. The helices 4 and 4' are driven in the same direction by the drive means. The helices 4 and 4' are of such a helically wound shape that as the helices rotate around axes A and A' under the action of the drive means, the helices scrape against one another and against the inner surfaces of the container 30.

In the aperture 22 of the housing 21 are replaceable feed elements in the form of two screws 5 and 5' which rotate in the same direction and interengage with one another. The screws 5 and 5' are installed at the lower interface of the primary stage 3 and the extruder 2 and they are connected to the helices 4 and 4' for rotation therewith. In order to replace the screws 5 and 5' they are detachably connected to the lower ends of helices 4 and 4', for example, by being threadably engaged therewith. The double conical container has its largest diameter at a level corresponding to approximately 75% of its height and hence the region of maximum diameter is located closer to the upper end of the container, as seen in FIG. 1. One or more supply ducts 6 are installed tangentially in this region or somewhat above or below this region. A degassing pipe 9 and an additional supply duct 6' are installed in the upper conical portion 32.

The double conical container 30 is provided with passages (not shown) for heating purposes. In this regard, a heating medium can be passed through passages between the outer surface 31" and the inner surface 31' of the lower conical portion 31 or between the outer surface 32" and the inner surface 32' of the upper conical portion 32. Inlet and outlet lines for supplying the heating medium to and from the passages in the walls of container 30 are provided but not shown in detail in the drawing. Heating can also take place in any other suitable manner, for example, electrically.

Figure 3:
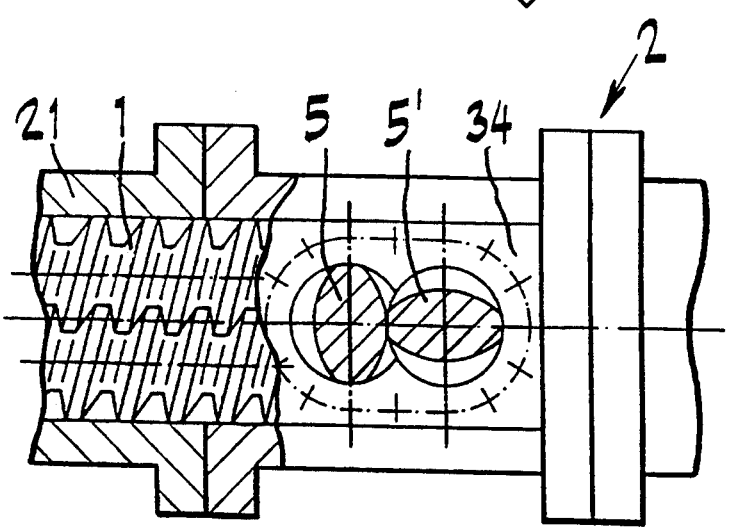
FIG. 3 is a diagrammatic sectional view taken along line III—III in FIG. 1.

The double conical container 30 is fastened in pressure-sealed manner onto the housing 21 of the screw-type extruder 2 by a flange 34. The extruder 2 can be provided with kneading disks or it can be constructed entirely as a screw-type extruder. Extending at the interface between the double conical container 30 and the screw-type extruder 2 are the two screws 5 and 5' which serve as feed elements. The screws 5 and 5' are installed centrally relative to the two screws 1 of the double shaft screw-type extruder 2, as seen in FIG. 3, and the free lower ends of screws 5 and 5' are flush with the inner surface of the housing 21 of extruder 2 and face the two screws 1 of the double-shaft screw-type extruder in immediate proximity thereto and with little clearance therebetween as shown in FIG. 1. However, instead of the central arrangement of the feed elements 5 and 5' as shown in FIG. 3, they can also be installed (depending on the plastic to be processed) directly above only screw 1 in the screw-type extruder 2 or they can be turned through 90° and provide feed laterally of the screws 1. The screws 5 and 5' are installed in a readily replaceable manner so that, if required, rapid exchange can take place. Instead of the extruder 2, the secondary stage can be any treatment, conditioning or production means containing a mixing or transport means for the plastic material.

Individual elements such as, for example, gear wheels for the drive assembly for the spiral helices 4 and 4' of the primary stage are not shown in detail in the drawings. The upper ends of the helices 4 and 4' are formed as parallel shafts 41 and 41', which are driven in rotation by the drive motor 8 and gear system 7 along respective axes of rotation A and A'. The shafts 41 and 41' and the screws 5 and 5' are in alignment with one another along the axes of rotation A and A'. The speed of rotation of the drive assembly is adjustable to correspond to the requirement as regards the type of plastic and/or type of application in question.

The method of the invention will be explained in more detail hereafter.

The helices 4 and 4' which are driven from above and rotate in the same direction extend spirally around their axes of rotation to scrape against the double conical wall of container 30 internally and, in addition, against each other to constantly clean their surfaces and prevent less stable portions of the product from stagnating and decomposing within container 30. At the same time, the helices 4 and 4' exert a transporting effect, scrape the product against the temperature-regulated inner surface of the container walls and, in this way, generate large surface areas which, for example, encourage the separation of gaseous fractions.

The material is supplied tangentially into container 30 through supply duct 6 in the region of the largest diameter of container 30, the material being supplied in the direction of rotation of the helices 4 and 4'. The gases which are released are removed by suction above the region of largest diameter through degassing pipe 9, while the product which remains behind is scraped in a circumferential direction and is thus conveyed downwardly towards the screw-type extruder 2. The movement of the product takes place toward the feed elements 5 and 5' and is influenced by the shape of the helices 4 and 4'. The addition of material can take place through the supply duct 6 and/or through the second supply duct 6' located at the top of conical portion 32. Various additives can also be added at supply ducts 6 and 6'. If required, additives can also be introduced tangentially in the opposite direction to the direction of rotation of the helices 4 and 4' through additional ducts (not shown).

The feed elements, consisting of the screws 5 and 5', are replaceable and, when appropriately selected, they can actively transport material, but they can also inhibit the transportation of material almost completely so that, for example, a desired level of quality of the product is produced in the double conical container 30. Under these conditions, the double conical container 30 can be operated at its own operational pressure, for example, a vacuum, independently of the extruder 2. In addition, the residence time can be readily varied over a wide range. Depending on the requirements, it is recommended that the drive means be selected on a variable speed basis.

The principal applications of the primary stage 3 in accordance with the invention are as follows:

1) As a continually operating first stage of a reaction.

A pre-condensate is supplied, for example, by duct 6 to the pair of helices 4 and 4' which seize and distribute the pre-condensate over the inner surface of the wall of the container 30. The vacuum which applied in container 30 ensures the removal of volatile monomeric components and the loss of heat of the molten material is simultaneously compensated by the heating of the wall of the container 30. In the residence time selected, by controlling the drive of the helices 4 and 4', a viscous intermediate reaction product is produced. The product undergoes polycondensation in the screw-type extruder 2 to produce the final desired properties.

2) As a continuously operating pre-evaporator.

A solution is added through duct 6 and/or duct 6' and the solution is spread out thinly on the inner wall surface of the container 30 by the pair of helices 4 and 4'. Solvents are evaporated, optionally with a simultaneously provided vacuum, and are removed by suction. The solution is concentrated down to small amounts of solvent and the solution is fed into the screw-type extruder 2 where it is degassed down to a few ppm of residual gas.

3) As a flash chamber.

A superheated product under pressure is supplied to container 30 through duct 6 which, in this case, is furnished with a nozzle (not shown) to produce a spray. Monomers and residual amounts of solvent in the spray evaporate in proportion to the amount of energy previously stored in them. The drop in temperature associated with the spraying and evaporation is counteracted by heating the wall of the container 30 if droplets form on the wall of the container. The process is continued in accordance with the normal operation procedures of a pre-evaporator.

4) As a degassing dome.

In addition to the usages described above, the double conical container 30, envisaged as a primary stage, can also be mounted on the double shaft screw-type extruder 2 at a degassing aperture therein (forward or reverse degassing). In this way, the solid fractions which are carried along with the stream of gas rain down within the double conical container 30 in the region of its largest diameter because of the lower velocity of the solid fractions and the solid fractions are transported by the pair of helices 4 and 4' and fed into the screw-type extruder 2. The gases which have been purified in this way are removed by suction from container 30.

A number of polymers and formulations can be produced with optimal throughput efficiency by the two-stage preparation of industrial plastics in accordance with the invention.

Many steps arising in the preparation or production of plastics are more economically controllable by means of the primary stage with the heatable double conical container 30 using the spiral helices 4 and 4' which clean themselves and the inner surfaces of the double conical container together with delivery of material, in a manner which does not involve dead spaces, from the primary stage to the second preparatory stage, e.g. the screw-type extruder or a gear pump for molten plastic material.

While the invention has been described in relation to a specific embodiment thereof, it will become apparent to those skilled in the art that numerous modifications and variations can be made within the scope and spirit of the invention as defined in the attached claims.

What is claimed is:

1. A process for treating plastic materials comprising:
   premixing and heating a starting material in a primary stage in a vertically disposed, double conical container having a region of maximum cross-section from which the cross-section of the container diminishes in opposite axial directions in upper and lower truncated conical portions towards respective upper and lower ends of the container,
   advancing the material in said container towards a second stage constituted by a double shaft screw extruder disposed at the lower end of the container, the advancing of the material being effected by rotating a pair of spirals in said container which scrape against one another and against an inside wall surface of the upper and lower truncated conical portions of the double conical container; and
   delivering the material from the lower end of the double conical container directly and without intermediate dead spaces, into the extruder using replaceable feed elements detachably connected to said spirals for rotation therewith, said feed elements penetrating into an aperture in a housing of said extruder.

2. A process as claimed in claim 1, comprising supplying said starting material tangentially into the double conical container in the region of the maximum cross-section of the container.

3. A process as claimed in claim 1, comprising conveying gases, released by said starting material, from said upper portion of the double conical container.

4. A process as claimed in claim 1, comprising effecting said premixing and heating of said starting material to deliver to said second stage a viscous intermediate reaction product.

5. A process as claimed in claim 1, comprising effecting said premixing and heating of said starting material to continuously evaporate solvents from said starting material and deliver said material in concentrated form to said second stage.

6. A process as claimed in claim 1, comprising supplying said starting material to said double conical container as a superheated spray to evaporate solvents in the starting material.

7. Apparatus for treating a plastic material comprising:
a first stage, including:
a double conical container having opposite ends;
two helical members rotatably supported in said container and shaped to scrape against one another and against an inner surface of the container as said helical members rotate;
drive means for driving said helical members in rotation in the same direction about respect axes of rotation;
means for supplying a plastic material into said container for treatment therein and transport by said helical members in a direction towards an outlet at one of the ends of the container;
a second stage, including;
an extruder comprising a housing and a transport means in a bore provided in said housing, said housing having an aperture, said container being mounted vertically on said housing at said aperture in sealing relation to deliver plastic material from said outlet at one end of the container directly into said housing; and
replaceable feed elements detachably connected to said helical members for rotation therewith about said axes of rotation, said feed elements penetrating into said housing through said aperture and having free ends facing said transport means with little clearance therebetween, said double conical container comprising two truncated conical portions connected mouth to mouth at larger diameter ends thereof to provide a region of maximum diameter for said container which diminishes in diameter towards upper and lower ends of the container, said region of maximum diameter being located closer to said upper end of said container.

8. Apparatus as claimed in claim 7, wherein said helical members extend vertically in said container and include upper ends driven by said drive means around said axes of rotation, said upper ends and said feed elements being in axial alignment, said drive means being at said upper end of the container.

9. Apparatus as claimed in claim 7, wherein said second stage comprises an extruder with two interengaging screws rotating in the same direction.

10. Apparatus as claimed in claim 7, wherein said double conical container has a degassing outlet in the truncated conical portion extending from said region of maximum diameter to said upper end of the container.

11. Apparatus as claimed in claim 7, wherein said replaceable feed elements comprise tightly interengaging screw members.

12. Apparatus as claimed in claim 7, wherein said outlet is the lower end of the container and said drive means is connected to the upper end of said container.

13. Apparatus as claimed in claim 7, wherein said means for supplying a plastic material into said container comprises a supply duct connected tangentially to said container in the vicinity of said region of maximum diameter.

14. Apparatus for treating a plastic material comprising:
extruder means for advancing a plastic material while mixing the plastic material, said means including a housing and mixing means in a bore in said housing, said housing having a wall with an aperture therein;
a vertical double conical container mounted on said housing in sealed relation around said aperture, said container having an open lower end communicating with said bore in said housing through said aperture, said container including two truncated conical portions having larger diameter ends joined in mouth to mouth engagement whereby the container has a maximum cross-section where the conical portions are joined and the cross-section of the container decreases towards opposite upper and lower ends of the container;
two helical members rotatably supported in said container for scraping against one another and against an inner surface of the two truncated conical portions of the container as said helical members rotate;
drive means at an upper end of the container for driving said helical members in rotation about respective axes of rotation; and
two feed elements detachably connected to said helical members for rotation therewith respectively about said axes of rotation, said feed elements extending through said aperture in said housing and having free ends in immediate proximity to said mixing means with little clearance therebetween.

15. Apparatus as claimed in claim 14, wherein said helical members extend vertically in said container and respectively include upper ends driven around said axes of rotation, said two feed elements comprising intermeshing screw members aligned vertically with said upper ends of said helical members for common rotation thereof with the upper ends of the helical members around said axes of rotation.

16. Apparatus as claimed in claim 15, wherein said vertical container has a degassing outlet in that truncated conical portion extending from the maximum cross-section of the container towards said upper end of the container.

17. Apparatus as claimed in claim 15, comprising means for supplying material into said container tangentially thereof for treatment therein and transport by said helical members in a downwards direction towards said feed element.

18. Apparatus as claimed in claim 11, wherein said screw members extend into said aperture in said housing of the second stage and have ends located substantially in flush relation with an inner surface of said housing.

19. Apparatus as claimed in claim 15, wherein said free ends of said feed elements are formed by ends of said intermeshing screw members which are located substantially in flush relation with an inner surface of said housing.

* * * * *